(12) United States Patent
Shibuya

(10) Patent No.: US 6,873,712 B2
(45) Date of Patent: Mar. 29, 2005

(54) METHOD FOR IDENTIFYING AN OBJECT IMAGE

(75) Inventor: Satoru Shibuya, Kyoto (JP)

(73) Assignee: Giken Trastem Co., Ltd., Kyoto (JP)

( * ) Notice: Subject to any disclaimer, the term of this patent is extended or adjusted under 35 U.S.C. 154(b) by 647 days.

(21) Appl. No.: 09/998,468

(22) Filed: Nov. 29, 2001

(65) Prior Publication Data
US 2002/0064299 A1 May 30, 2002

(30) Foreign Application Priority Data

Nov. 29, 2000 (JP) ........................................ 2000-362518
Nov. 9, 2001 (JP) ........................................ 2001-344447

(51) Int. Cl.[7] ................................................ G00K 9/00
(52) U.S. Cl. ........................ 382/103; 382/107; 348/169
(58) Field of Search ................................ 382/103, 107, 382/115, 307; 348/143, 149, 169, 170, 171; 342/90

(56) References Cited

U.S. PATENT DOCUMENTS 5,212,547 A * 5/1993 Otsuki ........................ 348/139
5,267,044 A * 11/1993 Nozaki et al. ............... 348/347
5,809,161 A * 9/1998 Auty et al. .................. 382/104
6,453,069 B1 * 9/2002 Matsugu et al. ............. 382/173
6,727,886 B1 * 4/2004 Mielekamp et al. ......... 345/157

* cited by examiner

Primary Examiner—Bhavesh M. Mehta
Assistant Examiner—Abolfazi Tabatabai
(74) Attorney, Agent, or Firm—Koda & Androlia

(57) ABSTRACT

A method for identifying an object image shown in a picture using density differences between an object image and a background. A screen taken by a camera is first divided into blocks; for each block, a Standard Object image is positioned based upon an arbitrary point on each picture; from the density differences in the picture, a normal vector of the outline portion of the Standard Object image is determined; then related vector data, that includes a position information up to a normal vector group and an angle information, is determined; the related vector data is stored as standard data in a block from which the normal vector is detected; a normal vector for a picture that shows an object image to be recognized is determined; from the normal vector, Answer points are determined based on standard data of the Standard Object image; and a focus point region comprised of Answer points is evaluated.

2 Claims, 10 Drawing Sheets

|   | 1 | 2 | 3 | 4 | 5 | 6 |
|---|---|---|---|---|---|---|
| 1 | 1a | 1b | 1c | 1d | 1e | 1f |
| 2 | 1g | 1h | 1i | 1j | 1k | 1l |
| 3 | 1m | 1n | 1o | 1p | 1q | 1r |
| 4 | 1s | 1t | 1u | 1v | 1w | 1x |

METHOD FOR IDENTIFYING AN OBJECT IMAGE

BACKGROUND OF THE INVENTION

1. Field of the Invention

The present invention relates to a method for identifying an object image by way of differentiating an object image from a background image shown on a picture and more particularly to a method for identifying an object image of, for instance, humans, vehicles, vegetables, etc. in a picture.

2. Prior Art

Conventionally for the Texture Analysis, a Fourier transformation is utilized to analyze a two-dimensional grayscale picture. The Fourier transformation for the picture generally is used to analyze the state of the surface of the object image shown in the picture. In such an analysis, a picture is divided into square regions, and a Fourier transformation is performed on the image data of the respective square regions, and crystal lattice directions, defects, etc. in the object image are analyzed based upon the obtained phase.

In this case, since a Fourier transformation is performed on the square regions, the obtained phase becomes a vertical or horizontal directional vector of the square region. Accordingly, when, with this method, recognizing an object image with an un-specific form in a picture, there is a need for an even greater calculation to determine the normal line direction of the outline portion of the object image. Moreover, since the picture is divided into squares, depending on the position of the boundary of the picture and the position where the square is arranged, the normal vector of the object image may not be obtained accurately. In order to reduce this disadvantage, a window function is applied on the outer portion of the square region so as to lighten the weight. However, this results in a longer calculation time.

On the other hand, in image processing in real time, when recognizing an indefinite shaped moving object image such as an individual (human), a differential image or phase difference of the current image and the prior image (one frame prior to the current image) is utilized. This conventional method is used to estimate the number of people, etc. based on the area of the region by way of detecting a density difference more than a set level from the differential image, etc. However, in this method, since the recognition of the object image is determined based on area size, it is unavoidable to incorrectly recognize the object image. For instance, it may recognize one large person as two people, or two small people moving in the same direction side by side as one person, etc.

In addition, in a single screen taken by a camera installed tilted at an angle at a predetermined location or by a camera with a wide-angle lens, etc., depending on the position where the object is located when its image is taken, the outline portion of the object image will be shown differently even though the same object is taken. Thus, according to the differential image processing etc., the area difference becomes larger, and it is difficult to judge whether it is the same object image or not.

SUMMARY OF THE INVENTION

Accordingly, the object of this present invention is to provide a method for identifying an object image that identifies, by way of using the density difference in the background image and the object image in a picture, the position, quantity, kind and the like of an object image more quickly and more easily, even when the image of an object is taken by a camera installed tilted or by a camera having a wide-angle lens.

The above-object is accomplished by the unique object image identifying method of the present invention, and the method comprises the steps of:

dividing a screen taken by a camera into a plurality of blocks;

placing a Standard Object image, which corresponds to the blocks, as an insert picture for each block in the screen, the placing being made based upon an arrangement point that is an arbitrary point in the blocks on a picture showing a background image and is used as a reference point;

determining, for the inserted picture, a standard normal vector group for outline portions of the Standard Object image based upon density differences in the Standard Object image and a background image;

determining related vector data which consists of a position information and an angle information, the position information being from an arrangement point of the Standard Object image to the respective normal vectors of a standard normal vector group of the Standard Object image, and the angle information being of a respective normal vector;

storing the related vector data as standard data for the Standard Object image in a block in which each normal vector of the standard normal vector group is detected;

storing standard data based on the Standard Object image for all of the divided blocks;

determining a normal vector group for outline portions of an object image based upon density differences in an object image and a background image for an inputted picture in a screen that shows an object to be identified and is taken by a camera;

determining Answer point groups, which are the same as arrangement points of the respective Standard Object image, from a normal vector group based upon standard data stored in blocks where a normal vector of a normal vector group appears; and evaluating a focus point region formed by the Answer point groups.

In the screen taken by a camera, depending on where the object is located (when the object is taken by the camera), it will show an object image with a different outline portion even if the same object is taken. However, by dividing the screen into a plurality of blocks, a Standard Object image that has an outline portion according to the location where it was when it was taken by the camera can be arranged so as to correspond to the respective blocks. Therefore, even when a camera is tilted or a camera is provided with a wide-angle lens, a Standard Object image can be arranged on the respective blocks, so as to correspond to the Standard Object image with an outline portion according to the location it was at when taken by the camera.

In addition, the standard normal vector group of the Standard Object image determined in the respective blocks is determined based upon the density differences in the Standard Object image and the background image. Accordingly, the standard normal vector group represents the respective Standard Object image.

Also, the respective standard data of every respective Standard Object image consists of the related vector data which is made up of the position information, which is from the arrangement point of the Standard Object image to each of the normal vectors, and the angle information of each individual normal vector. Accordingly the respective standard data specifies the Standard Object image of every arrangement point on the picture of every block.

Next, the object image to be recognized, which is in the input picture of the screen that is taken by a camera, almost matches the Standard Object image in the block that corresponds to the position in which the object image is shown on the screen. In other words, the Standard Object image of each block is set so that the camera and the outline portions correspond to the position in which the object image was at when taken by the camera.

Therefore, even when a camera takes an object image that is located at an arbitrary location, it will match the outline portion of the Standard Object image of the respective blocks.

Also, the normal vector group is determined based on the density differences of the object image to be recognized and the background image; accordingly, such normal vector group represents the object image.

Furthermore, from the normal vector group of the object image to be recognized and based upon the standard data, the Answer point group, which is the same as the arrangement point, is determined. In other words, for the normal vector group for the object image, the Answer point, which is the same as the arrangement point, is determined from the position information and angle information of the standard data for the block in which each individual normal vector of the normal vector group appears. As a result, a plurality of Answer points are also formed in the region wherein the center is the arrangement point for the Standard Object image placed in the concerned block. In other words, the Answer points are determined by performing an inverse operation of the related vector data when the standard data is made, and also the Answer point is the equivalent of the arrangement point when the Standard Object image is placed in the blocks. In this way, the standard data for determining the Answer point is stored in the block in which the normal vector of the object image is detected. Thus, instead of searching through all the standard data in the screen, only the blocks in which the standard data is stored are searched. Therefore, there is an advantage that the speed of the calculation of the Answer point is significantly fast.

In addition, for the evaluation of the focus point region formed from the plurality of Answer points, if the percentage, etc. of the Answer points which gather in the focus point region is evaluated as more than a fixed value of the local maximum point, then an object image that has the identity of the Standard Object image is recognized.

Moreover, with the use of this kind of normal vector, even if the brightness and darkness of the whole picture changes, the relative density differences in the object image and background image does not change. Accordingly, the object image and the background image are differentiated accurately and reliably.

In addition, the normal vector group can be substituted by a tangent line group and the normal vector can be substituted by a tangent line; and still the same effect can be obtained as in the case where the normal vector or normal line vector are used.

As described above, according to the present invention, the Answer point group of the normal vector group (or tangent line group) for the outline portion of the object image is determined according to the standard data for the arrangement point of the Standard Object image in the respective blocks; and the Answer point is evaluated. Thus, the position, quantity and kind of an object image shown in a picture is identified quickly and easily when the Standard Object image for every respective block is a specific object of, for instance, a human, vehicle and vegetable that has its own outline portion.

In addition, by way of dividing one screen that is taken by a camera into a plurality of blocks, the Standard Object image with an outline portion according to the position it is taken can be arranged on the respective block. Thus, even in cases where the object to be recognized is taken by a camera set to be inclined or is taken through a wide-angle lens, the position, quantity, and kind of the object image shown on the screen is identified.

Furthermore, the standard data needed in order to determine the Answer point of the normal vector of the object image is memorized in each of the blocks in which each normal vector is detected. Accordingly, there is no need to search all the standard data in the screen, and it is only necessary to search the standard data stored in the concerned blocks. Accordingly, the advantage is that the calculation of the Answer points is processed significantly faster.

BRIEF DESCRIPTIONS OF THE DRAWINGS

FIG. 1 is a diagram showing the picture converted into digital data;

FIGS. 2(a), 2(b) and 2(c) are diagrams showing an image of the fundamental wave Fourier transformation, wherein FIG. 2(a) shows a circle placed on the boundary of an object image and a background image, FIG. 2(b) shows the sine wave, cosine wave, s·p waveform and c·p waveform when the base line direction is a 0 degree angle, and FIG. 2(c) shows the result of the phase direction;

DETAILED DESCRIPTION OF THE INVENTION

Embodiments of the present invention will be described below with reference to the accompanying drawings.

The object image identifying method according to the present invention determines the normal vector for the outline portion of an object image by using the density difference between the object image and the background image in a picture that is converted into digital data and then identifies the object image based on the determined normal vector.

1. Method for Determining Normal Vector

First, the method to determine the normal vector will be described.

Figure 1:
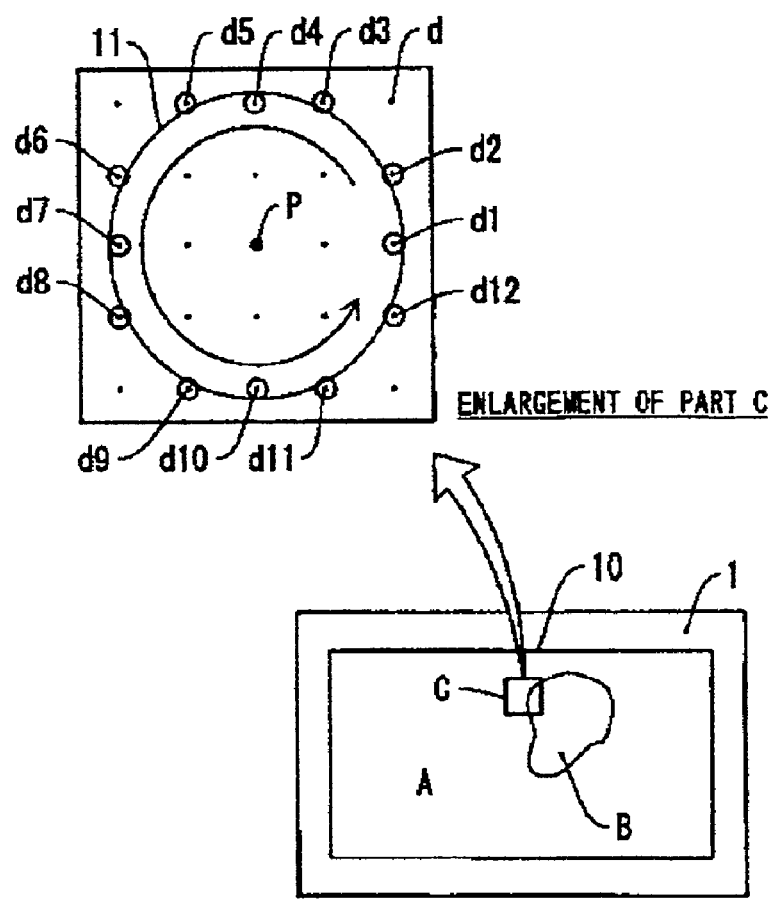

As shown in FIG. 1, points p are arranged at equal intervals on a picture 1. In other words, for the necessary region 10 (generally the entire picture region) on the picture 1, points p are arranged, for example, two (2) pixels apart horizontally and vertically. These points p can be predetermined fixed points. In FIG. 1, d, d1 through d12 and p all indicate pixels. The picture 1 can be a screen of, for instance, 320 pixels horizontally and 240 pixels vertically. For these respective pixels, when an object image is shown on the picture, the image density differs in brightness from, for example, 0 through 255 (256 level).

Next, a fundamental wave Fourier transformation is applied on the pixel value of each pixel on the circumference of a circle 11, whose center is point p, which is arranged two (2) pixels apart. For example, for the circle 11, a circle with a radius of two (2) pixels is drawn, and a fundamental wave Fourier transformation is performed on each twelve points (d1 through d12) on the circumference of this circle 11.

In this case, there are several ways of marking points d1 through d12 on the circumference of the circle 11. For example, start from a prescribed base line and move along the circumference, and successively mark the points counter clockwise or clockwise, or apply a window function on the square region so the shape becomes a circle or a circular shape. The points can be marked in different ways. The intervals of the adjacent points p are two (2) pixels, and the radius of the circle 11 is two (2) pixels; therefore, the adjacent circles 11 overlap with two (2) pixels.

In regards to the fundamental wave Fourier transformation, as shown by Equation (1) below, for the twelve points d1 through d12, the phase (sita) is determined from the arc tangent (ATAN) which utilizes a value (SV) that is a product sum of the sine wave of the fundamental wave Fourier transformation and a value (CV) that is a product sum of the cosine wave of the fundamental wave Fourier transformation. The term "fundamental wave" refers to a sine wave and a cosine wave where the length of one period is equal to the length of the circumference which center is point p.

$$\text{sita} = \text{ATAN}(SV/CV) \qquad \text{Equation (1)}$$

Accordingly, values SV and CV are determined by the following Equations:

$$SV = \Sigma_n d_n \cdot \sin((n-1)/N \cdot 2\pi) \qquad \text{Equation (3)}$$

$$CV = \Sigma_n d_n \cdot \cos((n-1)/N \cdot 2\pi) \qquad \text{Equation (4)}$$

In Equations (3) and (4), $\Sigma_n$ indicates the sum of n=1 through N.

The phase (sita) obtained from Equation (1) is a normal line direction (normal vector) of point p. This phase (sita) is to be determined for every point p that is arranged at regular intervals.

Figure 2A:
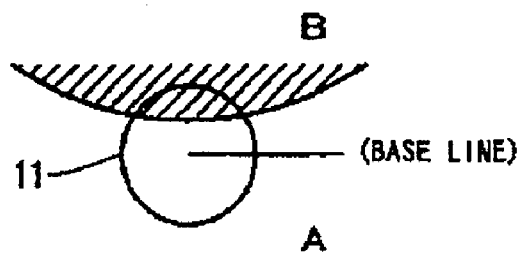
Figure 2B:
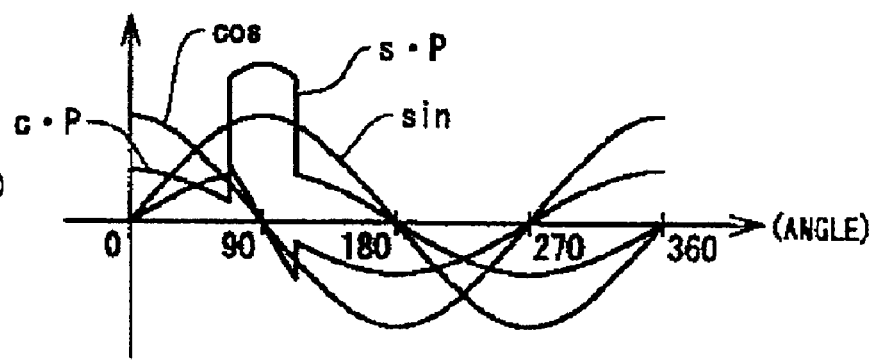
Figure 2C:
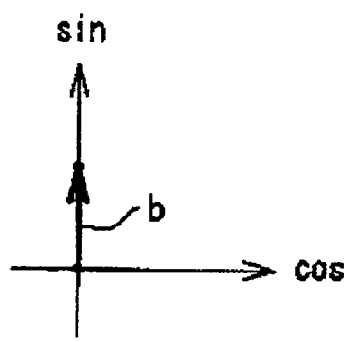

Now when an object image B is situated so that the circle 11, whose center is point p, overlaps on the image B as shown in FIG. 2(a), the waveform, which is obtained by multiplying the respective points d1 through d12 to the sine and cosine waves of the circle 11 rotated from the base line shown in FIG. 2(a) in the counter clockwise direction, is as shown in FIG. 2(b). In other words, as shown in FIG. 2(b), the waveform s·p, which is a combination of the sine wave and pixel value multiplied, has a positive peak at the 90 degree angle where the circle 11 overlaps with object image B; and, the waveform c·p, which is the cosine wave and pixel value multiplied, has a positive peak and a negative peak near the 90-degree angle. In addition, at the SV value, which is the sum of the waveform s·p, a positive peak appears at the positive 90-degree angle. Since the waveform c·p has an identical peak with only the difference in positive and negative near the 90-degree angle, such a peak cancel out; and at the CV value, which is the sum of this waveform c·p, the wave becomes flat. As a result, the phase obtained from the fundamental wave Fourier transformation from the Equation (1) appears at the 90-degree angle shown in FIG. 2(c), and this is precisely the normal vector for the outline portion of object image B.

However, the normal vector is invalid when the picture density is flat (and it is recognized as a background image A without object image B existing, or as a picture inside the object image B). Thus, in order to remove points p which are below a fixed level, as shown in the Equation (2) below, when the value (pow), which is the square root of the square sum of SV or CV, is less than the fixed value, then it is considered that point p does not have a normal vector. For instance, for the pictures that are obtained in the brightness value range of 0 through 255 (256 level), when the value is below a brightness value difference of 8 through 10, the above-described fixed value is set, and it is considered that there is no normal vector for the point p.

$$\text{pow} = \text{SQRT}(SV \times SV + CV \times CV) \qquad \text{Equation (2)}$$

According to the Equation (2) above, it is not necessary to calculate the normal vector based upon Equation (1) for points p where the density is flat. Therefore, the object image in the picture can be recognized more quickly and more precisely.

Figures 3, 4:
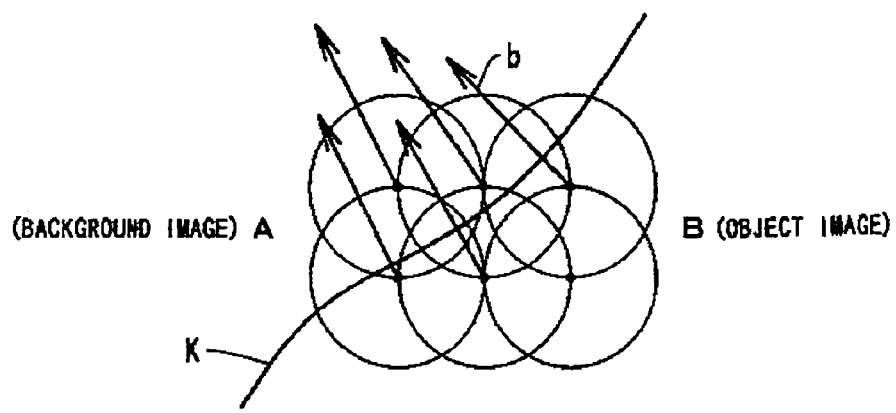
FIG. 3 is a diagram of the picture showing a normal vector b.
FIG. 4 is a diagram showing a screen divided into a plurality of blocks.

With the results obtained from the Equation (1) and the Equation (2); for example, a normal vector b shown in FIG. 3 can be obtained.

The points p arranged on the picture are arranged two (2) pixels apart in both the horizontal and vertical directions. The circle 11, whose center is the respective points p, is a circle 11 with a radius of two (2) pixels; and a fundamental wave Fourier transformation is performed on the twelve pixel values on the circumference of the circle 11, so that the adjacent respective circles 11 overlap every two (2) pixels. Therefore, the recognition of the object image can be performed in high resolution when normal vector b exists.

In this way, the existence of boundary K of object image B and background image A on a two-dimensional region is recognized from the normal vector group which is the aggregate of normal vector b for every point p arranged at equal intervals. In this method, for the normal vector b that is obtained by performing a fundamental wave Fourier transformation circularly, the precise boundary K of the object image B on the picture 1 is not determined. Rather when the normal vector group of point p, which is adjacent to another, point p faces in the same direction, the brightness gradient (density) of the region with a plurality of points p is considered as the normal vector group direction (see FIG. 3). Therefore, since the phase that is a result of the fundamental wave Fourier transformation performed circularly is used or since the normal vector b is used, the calculation is performed more quickly and easily.

In the above, points p are arranged two (2) pixels apart from each other and equally spaced on the picture 1. However, they can be set at, for instance, three (3) pixels, four (4) pixels apart. In regard to, the circles with the points p as the center, the radius must be set and drawn so that the circles overlap with the adjacent circle.

Furthermore, the phase is determined from the Equation (1). However, the phase can also be calculated by determining the approximate value by referring to a table based on the ratio of the SV value and CV value, which can also be obtained with sufficient precision.

Moreover, in the Equation (2) wherein the square root of the square sum of the SV value and CV value is used, the pow described above can be substituted for by using the sum of the absolute value of the SV value and the CV value.

2. Identifying an Object Image

The method of identifying an actual object image by using the above-described method of determining the normal vector will be described below.

First, the screen 1 that is taken by a camera is divided into, for example, a total of 24 blocks 1a through 1x by dividing the screen into 6 (six) horizontally and 4 (four) vertically as shown in FIG. 4.

Figure 5:
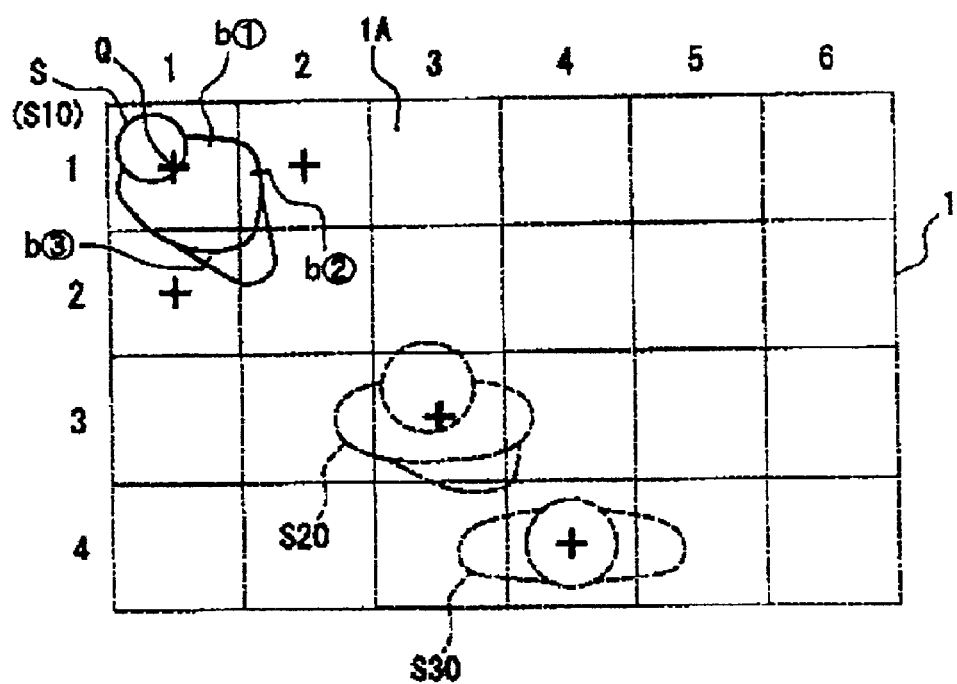
FIG. 5 is a diagram showing a screen in which a Standard Object image is inserted into the respective blocks corresponding to a camera installed above and tilted at an angle.

Then for example, as shown in FIG. 5, in the block 1a (column 1, row 1), a Standard Object image S (in the example of FIG. 5 a human is the model of the Standard Object image.) is placed according to the camera's tilted angle etc. This image S is referred to as an insert picture 1A. In this case, the Standard Object image S is placed using an arrangement point Q, which is an arbitrary point (for example, the center point of the block), as a reference point. In addition, the arrangement point Q is approximately the same as the center of gravity of the Standard Object image S.

In the screen 1, all the normal vectors (standard normal vector group) are detected with the Standard Object image S being placed only in the first block 1a.

A related vector data is then determined. The related vector data consists of the angle information of each of the normal vectors of the standard normal vector group and the position information to the arrangement point. The related vector data is stored as a standard data in the blocks where each of the normal vectors is detected. For example in FIG. 5, the normal vector b1 is detected in block 1a (see FIG. 4). Thus, the related vector data of this normal vector b1 is stored in block 1a.

Using the same steps, the related vector data of normal vector b2 is stored in block 1b (see FIG. 4), and the related vector data of normal vector b3 is stored in block 1g (see FIG. 4).

Next, the Standard Object image S placed in the first block 1a is cleared, thus leaving only the background image. For the next block 1b (see FIG. 4), in the same way, the Standard Object image is placed, and the related vector data is calculated, and the standard data is stored. Furthermore, in the same way, the Standard Object image is placed, the related vector data is calculated and the standard data is stored for all the plurality of divided blocks 1a though 1x. The standard data is thus obtained.

When the screen 1 is divided into about 192 blocks (16 horizontally, 12 vertically), the object image can be identified without any problems even when a camera with a wide-angle lens with over a 120-degree visibility angle is used. The number of blocks the screen is divided into can be chosen arbitrarily as long as the shape of the object image is determined the same among each block.

Next, the actual object image is recognized in the following method.

First, for the input picture in screen 1 which shows an object image taken by a camera, the normal vector group is detected. The standard data for the normal vector groups detected are stored in the blocks on the screen where the normal vector is detected. Therefore, for the normal vectors detected, an Answer point is placed based upon the standard data stored in the block where it is detected. Here, the Answer point is determined by performing an inverse operation of the related vector data when the standard data is made. In this way, the standard data used to determine the Answer point is stored in the blocks where the normal vector of the object image is detected. Accordingly, there is no need to search all the standard data in screen 1, and only the standard data that are stored in the blocks are searched. As a result, the calculation speed of the Answer points is processed even faster.

The calculation of such Answer points is performed for all the normal vectors detected; and an Answer point group, which is a plurality of Answer points gathered, is formed. The evaluation is performed depending on the points that gather in the focus point region that is formed from the Answer point group. From the local maximum point of the Answer point group, an object image (e.g. a human) for one Standard Object image is recognized.

In the example of FIG. 5, the model of Standard Object image S is a human; however, the model can be a vehicle, etc. In addition, the standard data can be made using various different kinds of Standard Object images such as humans, vehicles, etc. Moreover, the different kinds of object images such as humans, vehicles, etc. can be made to be recognized simultaneously and identified on the same screen. Furthermore, the standard data can be made using different sized Standard Object images of the same model; and the different sized Standard Object images (for example, in the case of humans, adults and children; and in the case of vehicles, large-sized vehicles and small sized vehicles) can be recognized and identified simultaneously on the same screen.

In the description below, the Standard Object image is a human; and the standard data making process and the object image identifying process will be described in detail based thereupon. In addition, to simplify the explanations, the location where the related vector data is stored is omitted; however, as described above, the related vector data, which consists of the standard data of the Standard Object image, is to be stored in the blocks in which the normal vector is detected.

(a) Standard Data Making Process

Figure 6:
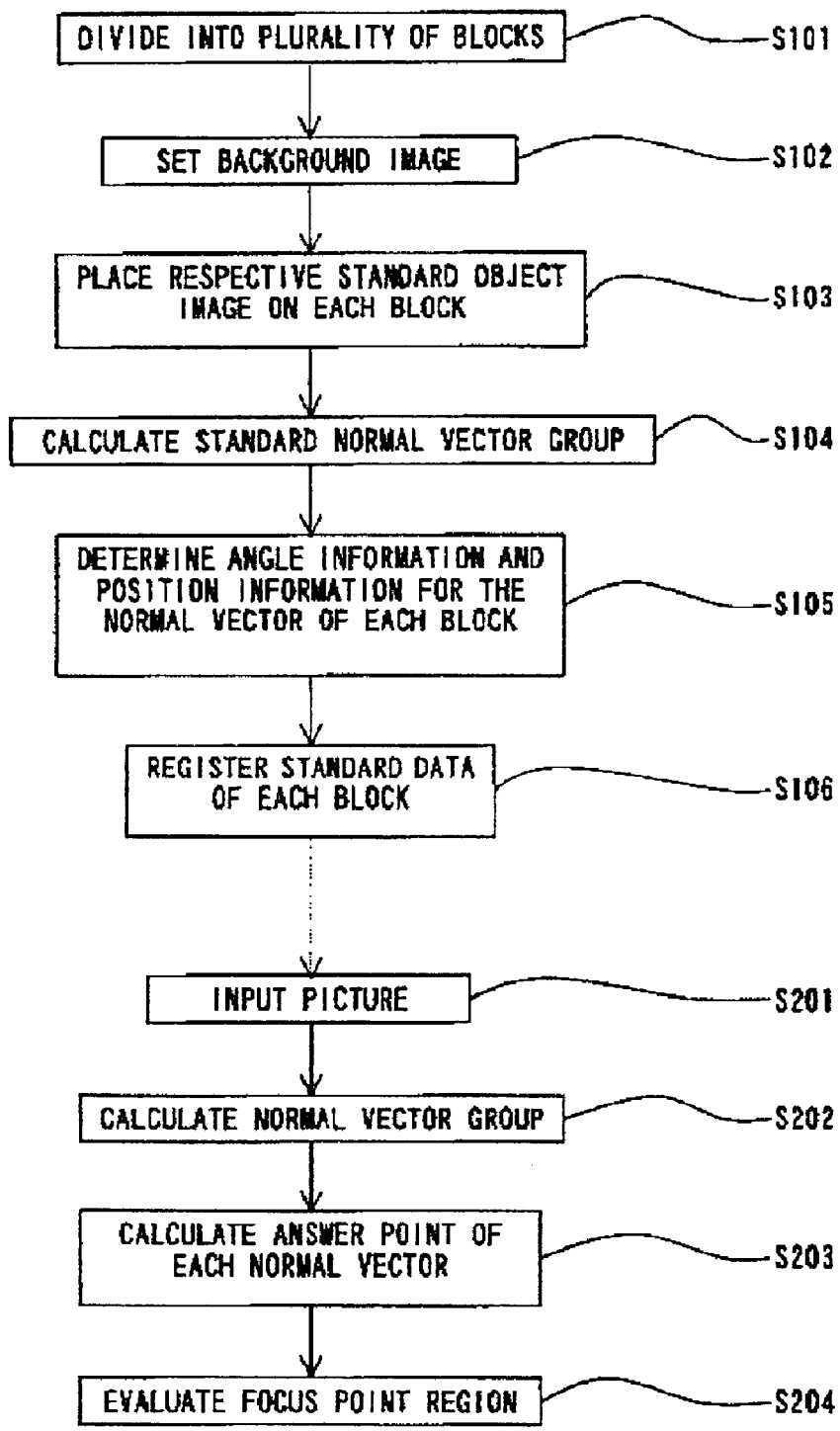
FIG. 6 is a flowchart of the image processing procedure according to one embodiment of the present invention.

As shown in the flowchart of FIG. 6, in step S101, one screen taken by a camera is divided into a plurality of blocks 1a through 1x as shown in FIG. 4.

In step S102, the image processing is performed on the picture, which shows only the background image in screen 1, according to the manner described in the "Method for Determining Normal Vector." Thus, the normal vector group for background image in screen 1 is determined. Almost all the pictures that show the background image are fixed images (though there are some exceptions for example, a moving image which shows movement of a door opening and closing), and it does not matter whether a variety of object images exist or it is a flat picture without an object image existing. The normal vector group information of such a background image is stored in the memory so that they correspond to the respective blocks in which the concerned normal vector is detected.

Next in step S103, for every block 1a through 1x, one Standard Object image, shaped as a human, is placed on the picture that shows the background image.

In this case, when the screen is taken by a camera that is installed tilted at an angle at a prescribed location or by a camera with a wide-angle lens, even if the object is the same, if the object is taken at a different position, it will show an object image with a different outline portion. For example, as seen from FIG. 7, the object image of each one of the objects S1, S2 and S3 taken by a camera 2 which is set at an inclined angle from above, each one of the objects S1, S2 and S3 is located in a different location, thus, each of the outline portions differ. Therefore, since each object S1, S2 and S3 is viewed from a different angle from the camera 2, the manner the camera shows each one of the objects S1, S2 and S3 are shown differently. As seen from FIG. 8, when a camera 20 with a wide-angle lens 21 is installed overhead and positioned straight down, the images of the objects S1, S2 and S3 taken by the camera 20 with a wide-angle lens 21 have different outline portions. In this case, due to the characteristics of the wide-angle lens 21, the angle in which the respective objects S1, S2, and S3 are taken are different, and thus the objects S1, S2 and S3 are shown differently.

Accordingly, a Standard Object image is arranged on the respective divided blocks, taking in account the camera angle and wide-angle lens, etc. of the camera 2 and 20. For example, as seen from FIG. 5, in the case of the camera 2 (shown in FIG. 7) that is tilted with an angle, a Standard Object image S10 that corresponds to the object S1 is placed in block 1a (column 1 and row 1). In addition, as shown by the dotted lines in FIG. 5, a Standard Object image S20 that corresponds to an object S2 is placed in block 1o (column 3, row 3), and a Standard Object image S30 that corresponds to a object S3 is arranged in block 1v (column 4, row 4).

Furthermore, in order to place the Standard Object images S10, S20 and S30 that correspond to each of the respective blocks on the picture in the block, an arbitrary point (arrangement point Q, for example the center of the block) is placed on the picture on the respective blocks; and the Standard Object images S10, S20 and S30 are arranged on the pictures, using the arrangement point Q as a reference point. The respective Standard Object images S10, S20 and S30 can be typical image data made by a calculation or can be real image data of the actual object taken by the camera 2 and 20, etc. In addition, for the insert picture 1A (refers to a picture which one Standard Object image placed in screen 1), which is a Standard Object image placed in one of the blocks among the plurality of divided blocks, image processing is performed according to the manner described in the "Method for Determining Normal Vector". Then, the normal vector group, which originates from the background image, and the normal vector group, which originates from the Standard Object image, is obtained in the picture 1A in which the Standard Object image is inserted. For example, a normal vector group that originates from the Standard Object image S20 and a normal vector group that originates from the background image are obtained in the insert picture 1A in which the Standard Object image S20 corresponding to block 1o (column 3, row 3) of FIG. 5 is arranged.

Figure 9:
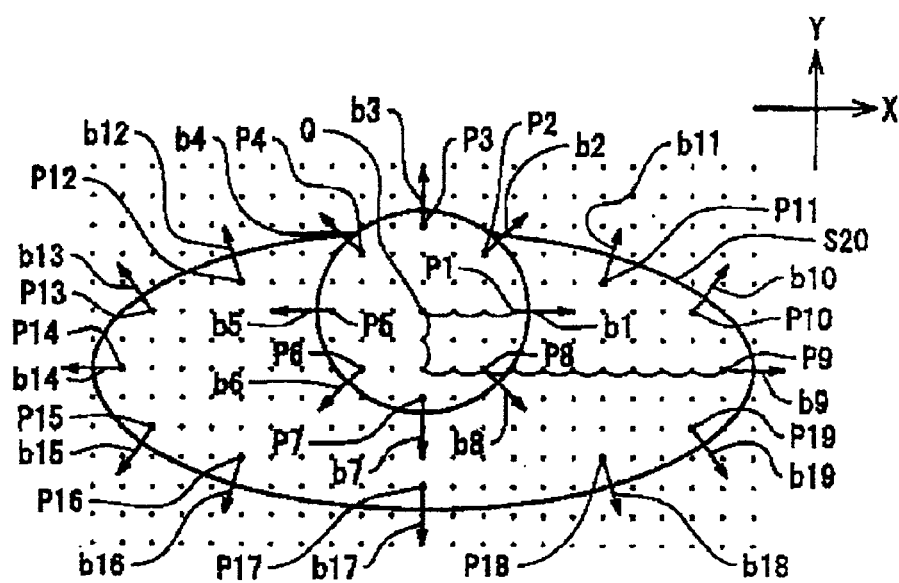
FIG. 9 is a diagram showing the standard normal vector of the Standard Object image.

Next in step S104, the normal vector group (referred to as a "standard normal vector group") that originates only from the Standard Object image S20 is calculated. This is done by the background processing that uses the normal vector group information of the background image registered in the memory in step S101. In other words, for the picture 1A with the inserted Standard Object image S20, all normal vector groups that are almost the same as the normal vector groups of the background image are removed. Then, all the normal vector groups originating from the background image are removed from, for example, the picture 1A that has the inserted Standard Object image S20. As a result, as shown in FIG. 9, the standard normal vector group b1 through b19 that originates only from the Standard Object image S20 are obtained. In FIG. 9, the screen and each of the blocks are omitted, and only the Standard Object image S20 is shown. For the coordinate axis, the top to bottom of the drawing sheet represents the Y-axis direction, and the left to right of the drawing sheet represents the direction of the X-axis. In addition, in FIG. 9, a normal vector resides for all the points p when there is a brightness gradient; and only the typical vectors (b1 through b19) are shown in FIG. 9. The same applies to FIG. 11. In addition, the origin of the coordinate (X=0, Y=0) is at the arrangement point Q.

Next in step S105, the position information and angle information of the respective standard normal vectors b1 through b19, . . . , for each standard normal vector group, is determined. The position information is indicated by the coordinates from arrangement point Q of the Standard Object image S20 to the points p1 through p19 of the respective standard normal vectors b1 through b19, . . . . The angle information is indicated by, for example, the angle inclination of each standard normal vector b1 through b19, . . . , for the X-axis direction.

However, if this angle information is over 180 degrees, then 180 degrees is subtracted from that angle. The reason for this subtraction is as follows: if the density of, for example, the left and right sides of the object image to be recognized differs greatly, the density of the background image of the left and right sides become reversed for the object image. This occurs when, for example, the color of the left side and right side of the background differs from each other, for instance, when one side is covered with a dark colored doormat and the other side is a bare light-toned floor, etc. Generally, the normal vector group, due to the density difference in the background image and the object image, is set as vectors that point in the outward or inward direction with reference to the object image. Therefore, the vector direction of the normal vector on the left side and right sides of an object image becomes an opposite direction. However in the case above, for example, the right half becomes outwards and the left half becomes inward; and the vector direction of the normal vector group of the left and right side points become the same direction. Accordingly, the angle information is considered as an angle up to a 180-degree angle.

The method of determining the position information and angle information will be described in more detail below.

For example, of the standard normal vector group b1 through b19 shown in FIG. 9, 0 degrees (that is in the horizontal direction, or the X-axis direction in FIG. 9) is chosen as the angle information. In this case, for the standard normal vector pointing in the direction in the 180 degree angle, 180 degrees is subtracted as described above and will be dealt as a standard normal vector pointing in the 0 degree angle. As a result, there are four standard normal vectors, b1, b5, b9 and b14 that are of the 0 degree angle.

Next, the position information of the respective standard normal vectors b1, b5, b9 and b14 are determined. In other words, the standard normal vector b1 is located three (3) pixels in the positive X-direction from the arrangement point Q to point p1 and is at a point where X=3, and Y=0. The standard normal vector b5 is located three (3) pixels in the negative X-direction from the arrangement point Q to point p5 and is at a point where X=−3 and Y=0. The standard normal vector b9 is located two (2) pixels in the negative Y-direction and ten (10) pixels in the positive X-direction from the arrangement point Q to point p9 and is at a point where X=10 and Y=−2. The standard normal vector b14 is located two (2) pixels in the negative Y-direction and ten

(10) pixels in the negative X-direction from the arrangement point Q to point p14 and is at a point where X=−10 and Y=−2.

From the result above, four position information (X=3, Y=0), (X=−3, Y=0), (X=10, Y=−2) and (X=−10, Y=−2) exist for the standard normal vectors b1, b5, b9, b14 in which angle information is a 0 degree angle. In addition, the four position information (X=3, Y=0), (X=−3, Y=0), (X=10, Y=−2) and (X=−10, Y=−2) and the 0 degree angle information becomes the related vector data.

In the same manner as described above, the position information of the standard normal vector group for the angle information up to the angle of 180 degrees is determined; and the angle information and the position information determined are linked as related vector data. Thus, the obtained related vector data becomes the standard data for the Standard Object image S20.

Next in step S106, the standard data, which is the related vector data comprised of the position information linked with the angle information determined in step S105, is registered in the memory in correspondence with the block in which the standard normal vector is detected.

The standard data, which is comprised of the related vector data that is made up of the angle and position information, is determined for each of the other blocks in the same manner as described above. The standard data is made for all the blocks. The standard data making process is thus completed.

The angle information can be a fixed range value. For instance, it can be shown so that the range from a 0 degree angle to a 180 degree angle is divided by, for example, 15 degrees, thus forming twelve ranges.

(b) Object Image Identifying Process

Figure 7:
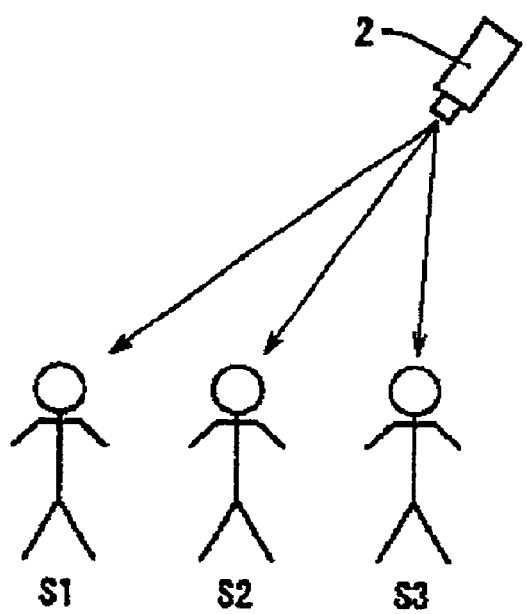
FIG. 7 is a diagram showing an object that is being taken from above by a camera installed tilted at an angle.
Figure 8:
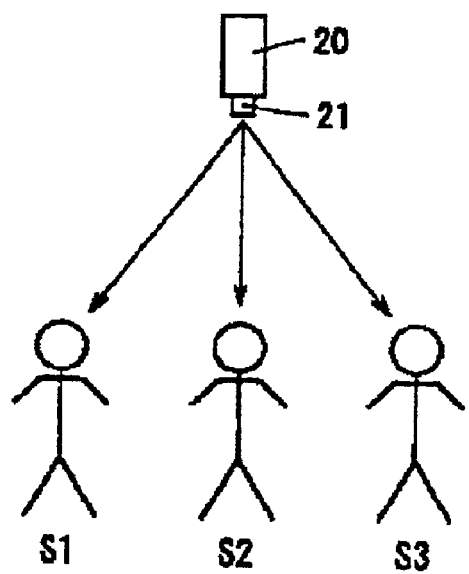
FIG. 8 is a diagram showing an object that is being taken by a camera equipped with a wide-angle lens, installed overhead and positioned straight down.
Figure 10:
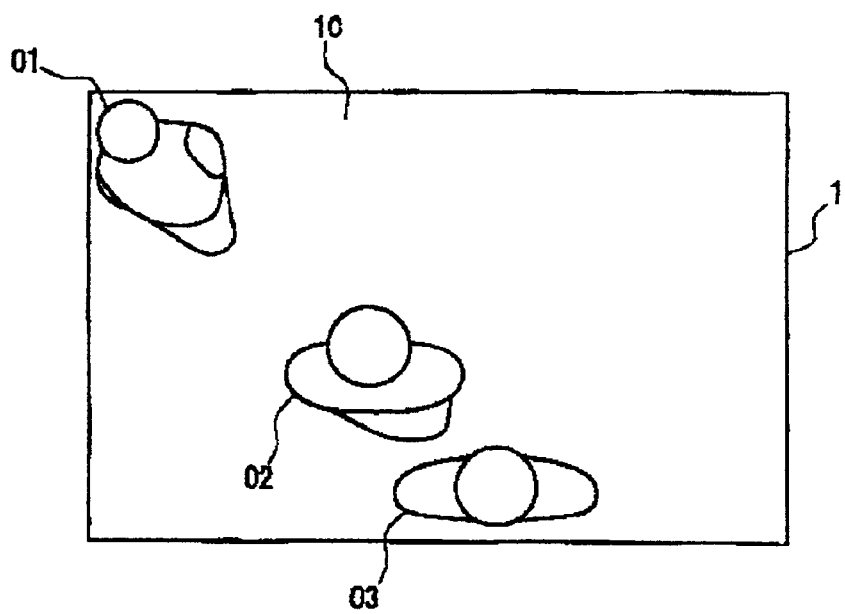
FIG. 10 is a diagram showing the state in which the object image to be recognized is shown on a screen.

Next, in the object image identifying process, as shown in the flowchart in FIG. 6, the picture showing the object that is to be identified, which is taken by a camera, is inputted in a computer memory in step S201. The picture 1C that is inputted in the computer can be a picture of the screen 1 that contains three object images O1, O2, and O3 as shown in FIG. 10. The picture in the screen 1 of FIG. 10 corresponds to a picture in which an object to be recognized exists in the location where the object S2 is taken by the camera 2 that is installed inclined at an angle as shown in FIG. 7.

In the following description, the image processing will be explained focusing on the object image O2 shown in the middle of the screen. However, when applied in practice, the same image processing is performed for object image O1 and object image O2 as well.

Figure 11:
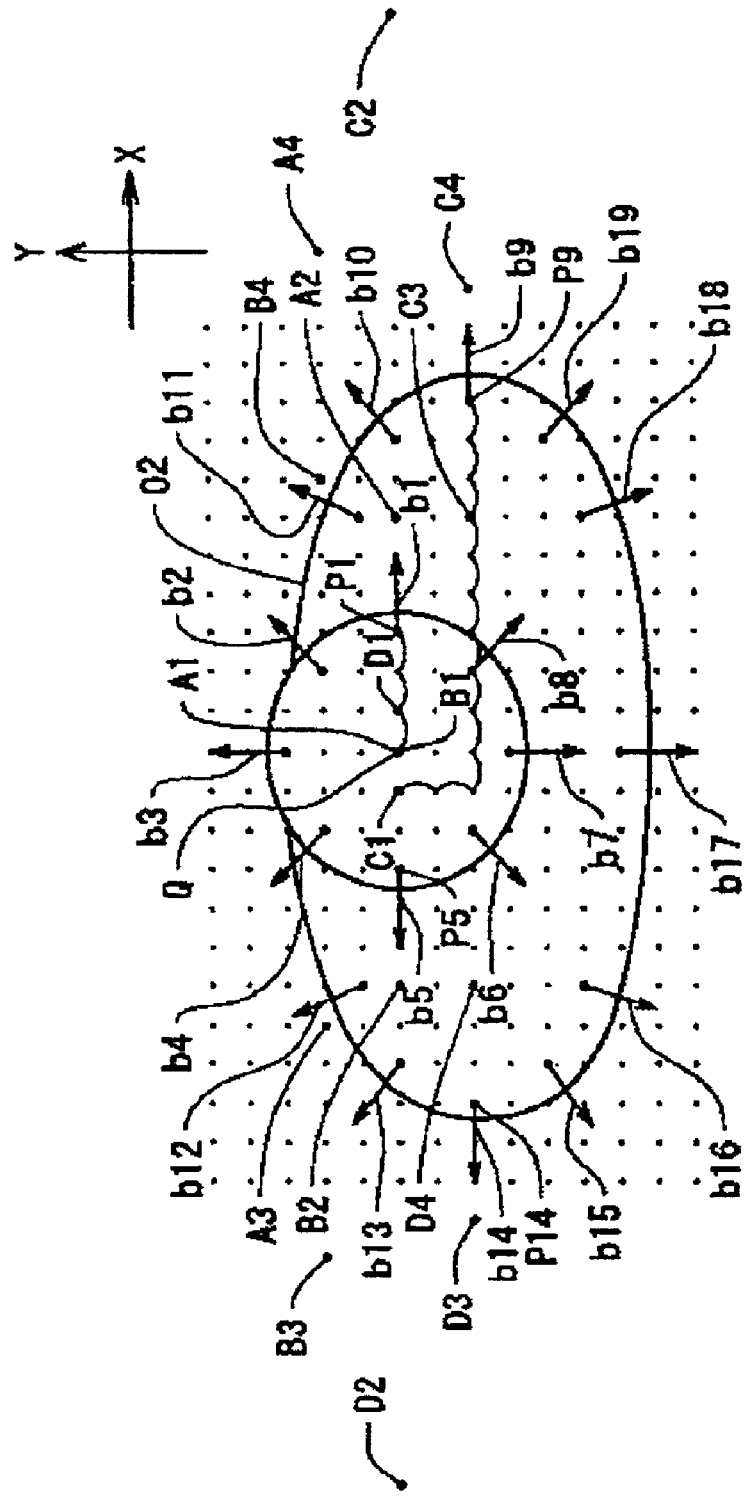
FIG. 11 is a diagram illustrating the method of determining the Answer point group for the object image.

In step S202, the normal vector group that originates only from the object image O2 in the input picture 1C is determined. Of the normal vector groups obtained from the input picture 1C, the normal vector groups in which the vector direction does not change for a predetermined long period of time, approximately two (2) minutes, are considered that the normal vectors originate from the background image. All the normal vector groups which do not change for a predetermined long period of time, approximately two (2) minutes, are removed. In other words, the background image is obtained as a virtually stationary image, which does not change; therefore, the vector direction of the respective normal vector group, which originates from the background image, does not change for a long period of time. Thus, all the normal vector groups originating from the background image are removed from the input picture 1C. As a result, the normal vector group b1 through b19 as shown in FIG. 11, which originate only from the object image O2, are obtained. Again, by processing the background, the noise from the background is reduced, the object is identified in high precision, and the calculation time of the Answer point group (which will be described later) can be shortened. In FIG. 11, the outer rectangular frame of the screen 1 is omitted, and only the object image O2 is shown enlarged. As for the coordinate axis, the top to bottom of the drawing sheet represents the Y-axis direction, and the left to right of the drawing sheet represents the direction of the X-axis.

In step S203, the Answer point groups of the normal vector groups that originate only from object image O2 are calculated. Here, the term, "Answer point" refers to the arrangement point Q at the time the standard data is calculated for the respective blocks divided as described above. In addition, the calculation of the Answer point group is performed by an inverse operation of the calculation process of the standard data. More specifically, the calculation process is performed according to the angle information and position information (related vector data) of the standard data for each of the respective blocks registered in step S106.

Next, using the object image O2 shown in FIG. 11, as an example, the calculation of the Answer point groups will be described below.

The calculation of each Answer point will be described below using the normal vectors b1, b5, b9 and b14 as an example in which the angle information is, for instance, a 0 degree angle (that is a horizontal direction or the X-axis direction in FIG. 11).

The position, where the object image O2 is shown on the screen of FIG. 11, is approximately the same as the Standard Object image S20 placed on the block (column 3, row 3) shown in FIG. 5. Therefore, the calculation is based on the standard data of the Standard Object image S20. As described above, there are four position information (X=3, Y=0), (X=−3, Y=0), (X=10, Y=−2) and (X=−10, Y=−2) which are linked with the 0 degree angle information. Therefore, for all the normal vector groups b1 through b19 of the object image O2 shown in FIG. 11, that are in the horizontal direction (0 degree angle direction or 180-degree angle direction), the Answer point group is determined by performing an inverse operation of the four position information.

In other words, including the normal vectors which points in the 180-degree direction as described above and the 0 degree angle normal vectors, these four normal vectors, b1, b5, b9 and b14 for the object image O2 shown in FIG. 11. On each of the points p1, p5, p9 and p14 of the four normal vectors b1, b5, b9 and b14, an inverse operation of the four position information (X=3, Y=0), (X=−3, Y=0), (X=10, Y=−2) and (X=−10, Y=−2) is performed so as to determine the Answer point groups. In other words, for the respective points p1, p5, p9 and p14, the respective points (Answer points) of −(X=3, Y=0), −(X=−3, Y=0), −(X=10, Y=−2), and −(X=−10, Y=−2) are determined.

More specifically, for the normal vector b1, four Answer points are placed. Such four Answer points are: point A1 which is a point with three (3) pixels apart from point p1 in the negative X-direction according to −(X=3, Y=0), point A2 which is a point with three (3) pixels apart from point p1 in the positive X-direction according to −(X=−3, Y=0), point A3 which is a point with ten (10) pixels apart from point p1 in the negative X-direction and with two (2) pixels apart from point p1 in the positive Y-direction according to −(X=10, Y=−2), and point A4 which is a point with ten (10) pixels apart from point p1 in the positive X-direction and with two (2) pixels apart from point p1 in the positive Y-direction according to −(X=−10, Y=−2).

Likewise, for the normal vector b5, the Answer points are respectively placed on: point B2 according to −(X=3, Y=0), point B1 according to −(X=−3, Y=0), point B3 according to −(X=10, Y=−2), and point B4 according to −(X=−10, Y=−2), which are apart from point p5, respectively.

For normal vector b9, the Answer points are respectively placed on: point C3 according to −(X=3, Y=0), point C4 according to −(X=−3, Y=0), point C1 according to −(X=10, Y=−2), and point C2 according to −(X=−10, Y=−2), which are apart from point p9, respectively.

Furthermore, for normal vector b14, the Answer points are respectively placed on: point D3 according to −(X=3, Y=0), point D4 according to −(X=−3, Y=0), point D2 according to −(X=10, Y=−2), and point D1 according to −(X=−10, Y=−2), which are apart from point p14, respectively.

The above respective Answer points can be placed by, for instance, raising the brightness value of the concerned point one level, etc. The calculation of the respective Answer points for all the normal vectors b1, b5, b9 and b14 that have angle information of 0 degrees is completed by the above operation.

In the same manner, the Answer point groups for every respective normal vector up to the 180 degree angle information is calculated by the position information which is linked with the angle information.

All the Answer point groups for the object images O1, O2 and O3 to be recognized in the input picture 1C (see FIG. 10) are calculated in the same manner. Then, in the input picture 1C shown in FIG. 10, an evaluation screen 1D that shows the Answer point groups for the object image O1 through O3 is obtained as shown in FIG. 12.

Figure 12:
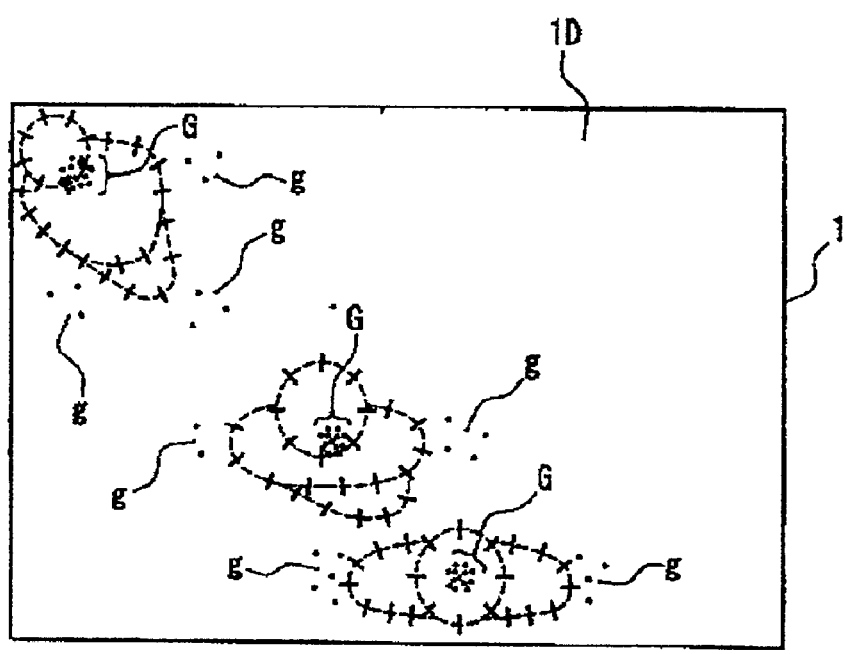
FIG. 12 is a diagram showing the evaluation screen for the object image that is to be recognized and is shown in FIG. 10.

In the evaluation screen 1D shown in FIG. 12, the dotted line showing the object image and the normal vector groups do not appear on the actual screen.

Next in step S204, the Answer point groups of the evaluation screen 1D are evaluated. This evaluation is performed in a region spaced, for instance, two (2) pixels apart, (this region is referred to as a 'vector focus point region' and is indicated with the symbol G and g in FIG. 12.) The evaluation is performed whether or not more than 40 percent of the Answer points of points p (in this case 19 points) of the normal vector group can be obtained or not. If the result of the evaluation determines that more than 40 percent of the Answer points exist in the vector focus point region G and g (the local maximum point G of the vector focus point region G and g), then it is judged that each object image has the same identity (or the object image O is the same) as the Standard Object image. On the other hand, if it is determined that it is below 40 percent (the point g of the vector focus point region G and g), it is considered that the object image does not have the same identity (or the object image O is not the same) as the Standard Object image. Therefore, if the object image is determined to be identical with the Standard Object image, then it is determined that the picture 1C with an object image O1 through O3 inputted has an object image that has the same identity as the Standard Object image.

On the other hand, if it is considered that object image O1 through O3 and Standard Object image do not have the same identity, it is determined that the input picture 1C of object image O1 through O3 does not have an object image that has the same identity as Standard Object image. Furthermore, by way of counting the number of existing local maximum points G, the quantity of existing object images O1 through O3 in the input picture 1C are counted. The calculation of the Answer point groups in step S203 is performed for the whole screen and therefore all the points p in the input picture are calculated. Thus, if a plurality of object images exist in the input picture 1C, regardless of the position, the same number of local maximum points G of the vector focus point regions that correspond to such number of object images are formed.

As seen from the above, in the shown embodiment, the Answer point group of the normal vector group for the outline portion of the object image O is determined according to the standard data for the arrangement point Q of the Standard Object image S10, S20 and S30 of the respective blocks. Then, these Answer point groups are evaluated, so that the position, quantity and kind of an object image which has the same identity as the respective Standard Object image S10, S20 and S30 are identified more quickly and easily. In addition, the related vector data used to determine the Answer point of the object image is stored in the blocks in which the normal vector of the object image is detected. Thus, instead of searching through all the standard data in screen 1, only the standard data stored in the blocks are searched. The calculation of the Answer points is processed speedily in a significantly short period of time.

Moreover, one screen 1 is divided into a plurality of blocks. Thus, the Standard Object image S10, S20 and S30, each having an outline portion according to where the object image was located when it was taken by the camera 2 and 20, can be arranged on the respective blocks. As a result, the position, quantity and kind of the image O of the object can be identified even when the inserted screen is taken by the camera 2 installed tilted at an angle or by the camera 20 having a wide-angle lens 21.

In the above embodiment, as shown in FIG. 4, the screen 1 is divided into 6 (six) horizontally and 4 (four) vertically. When, however, the screen is divided into 192 blocks (16 horizontally, 12 vertically), the object image can be identified without any problems even when a camera having a wide-angle lens with over a 120-degree visibility angle is used. The number of blocks the screen is divided into can be chosen arbitrarily as long as the shape of the object image in each individual block is determined to be the same.

In addition, in the above-described embodiment, it can be performed that: the respective Standard Object image S10, S20 and S30 of every respective block itself is divided into two or more parts; the same number of standard data is made for the divided parts for each divided Standard Object image; the Answer point group of every standard data for the object image O to be recognized is determined; the same number of MAP screens, which are the Answer point groups determined for every standard data, are made according to the number of divided standard objects; an evaluation screen is formed by combining the respective MAP screens into one screen; and then the focus point regions formed from the Answer point groups in the evaluation screen are evaluated.

As seen from the above, by dividing the Standard Object image S10, S20 and S30 into two or more parts, standard data can be made for the respective Standard Object image S10, S20 and S30 divided for every part shaped differently. In addition, for the parts having different shapes, by way of processing the picture that shows the object image O to be recognized for each plurality of standard data, the consistency of each part improves, even if the outline shape of the whole object image to be recognized does not match the whole Standard Object image. Accordingly, for the object image, all the Standard Object images divided are identified. Thus, by locating all the divided Standard Object images in the object image, the existence of an object image, which has the same identity as the Standard Object image, can be determined.

For example, in the case of humans, the outline shape of the head and the upper body are different. The actual human (object image to be recognized) can be bigger or smaller than the Standard Object image, or an object can be holding a bag in one's hand. Thus, it is difficult to completely match the outline shapes with that of the Standard Object image. However, as in the present invention, by way of being based on the standard data divided for each part that is shaped differently, even if there may be some inconsistencies, if the object image in the evaluation screen has a head and an upper body, it is determined that the object image of a human is identical with the Standard Object image. Thus, the identifying precision is improved.

Also, in the embodiment described above, the evaluation is performed according to whether equal to or more than 40 percent of the Answer points gather in the vector focus point region G. The percentage does not have to be limited to 40 percent, and it can be set at an appropriate percentage. This is because different situations and other outside influences need to be considered. Such situations includes, for instance, a case in which the object image is difficult to match the prescribed form of the Standard Object image and a case in which the object image easily matches the prescribed form of the Standard Object image.

Furthermore, the vector focus point region G is not necessarily limited to a region spaced two (2) pixels apart with the arrangement point Q as its center. With the object image to be recognized and the identifying precision etc. into consideration, the range that has an arrangement point Q as the center can be set at an appropriate range.

Furthermore, in the above-described embodiment, a human being is described as the Standard Object image. The Standard Object image can be a vehicle, a vegetable, etc. to determine an object image that has the same identity as the Standard Object image.

Furthermore, the Standard Object image, which in this case is a human, is viewed from above in the above description. However, it can be taken from the side or from other various directions. Moreover, the size of the Standard Object image is not limited to a particular size. The Standard Object image can be children or adults. In this case, various different standard data can be made based upon a plurality of Standard Object images of different sizes in the respective blocks. Furthermore, a plurality of Standard Object images, for each divided plurality of Standard Object images with different sizes, etc., can be utilized as the divided Standard Object image as in the above-described MAP screen.

In the embodiment described above, the normal vector group for the outline portion of the object image is determined. Instead of a normal vector group, a tangent line group for the outline portion of the object image can be determined as well. In the case of determining the tangent line group, the angle information of the standard data, compared to the above-described embodiment, shifts 90 degrees, and the direction in which the tangent line is directed is in the range of a 180 degree angle. Thus, the subtracting process becomes unnecessary. Still, the object image with the identity of the Standard Object image can be determined in the same way as in the above embodiments.

In addition, the normal vector is determined from a phase where a Fourier transformation is performed circularly. However, the present invention is not limited to this. The normal vector can be determined by another known method. Further, the tangent line can be determined from a phase in which a Fourier transformation is performed circularly, and the tangent line can be determined in another known method instead.

What is claimed is:

1. A method for identifying an object image that uses a density difference between a background image and an object image in a picture, said method comprising the steps of:

dividing a screen taken by a camera into a plurality of blocks;

placing a Standard Object image, which corresponds to said blocks, as an insert picture for each block in said screen, said placing being made based upon an arrangement point that is an arbitrary point in said blocks on a picture showing a background image and is used as a reference point;

determining, for said inserted picture, a standard normal vector group for outline portions of said Standard Object image based upon density differences in said Standard Object image and a background image;

determining related vector data which consists of a position information and an angle information, said position information being from an arrangement point of said Standard Object image to respective normal vectors of a respective said standard normal vector group of said Standard Object image, and said angle information being of a respective normal vector;

storing said related vector data as standard data for said Standard Object image in a block in which each normal vector of said Standard normal vector group is detected;

storing standard data based on said Standard object image for all of said divided blocks;

determining a normal vector group for outline portions of an object image based upon density differences in an object image and a background image for an inputted picture in a screen that shows an object to be identified and is taken by a camera;

determining Answer point groups, which are the same as arrangement points of respective said Standard Object image, from a normal vector group based upon standard data stored in blocks where a normal vector of a normal vector group appears; and evaluating a focus point region formed by said Answer point groups.

2. The method for identifying an object image according to claim 1, wherein a tangent line group is used instead of said normal vector group, and a tangent line is used instead of said normal vector.

* * * * *